United States Patent [19]

Ono

[11] Patent Number: 4,814,789
[45] Date of Patent: Mar. 21, 1989

[54] THERMAL RECORDING PROCESS AND APPARATUS THEREFOR

[75] Inventor: Takeshi Ono, Yokohama, Japan

[73] Assignee: Canon Kabushiki Kaisha, Tokyo, Japan

[21] Appl. No.: 12,607

[22] Filed: Feb. 9, 1987

[30] Foreign Application Priority Data

Feb. 12, 1986 [JP] Japan .................................. 61-26741
Mar. 10, 1986 [JP] Japan .................................. 61-51759

[51] Int. Cl.⁴ ............................................ G01D 15/00
[52] U.S. Cl. .................. 346/76 PH; 364/519
[58] Field of Search ............... 346/76 PH, 154, 76 R, 346/139 R, 162-164, 518-523; 400/120; 219/216 PH; 250/317.1, 318

[56] References Cited

U.S. PATENT DOCUMENTS

| | | | |
|---|---|---|---|
| 4,070,587 | 1/1978 | Hanakata | 346/76 R |
| 4,366,545 | 12/1982 | Kawanabe | 364/569 |
| 4,407,003 | 9/1983 | Fukui | 346/76 R |
| 4,415,908 | 11/1983 | Sugiura | 346/76 PH |
| 4,447,819 | 5/1984 | Moriguchi et al. | 346/76 PH |
| 4,510,505 | 4/1985 | Fukui | 346/76 PH |

*Primary Examiner*—Arthur G. Evans
*Attorney, Agent, or Firm*—Fitzpatrick, Cella, Harper & Scinto

[57] ABSTRACT

A thermal printer that can select either a first recording mode, in which recording operation is performed while a recording sheet is moving, or a second recording mode, in which recording operation is performed while the recording sheet is stopped, according to the length of recording cycle or regularity of recording cycle.

23 Claims, 6 Drawing Sheets

THERMAL RECORDING PROCESS AND APPARATUS THEREFOR

BACKGROUND OF THE INVENTION

1. Field of the Invention

The present invention relates to a thermal recording apparatus and a process therefor, and more particularly to a thermal recording apparatus and a process therefor adapted for use in the recording unit of a facsimile apparatus or the like.

2. Related Background Art

In the conventional thermal recording process, the time required for, moving a recording sheet by a step is selected to be approximately equal to the time required for recording a line, in order to improve the efficiency in time. In such process there is employed so-called "movement printing" in which the printing operation is conducted simultaneously with the triggering of the stepping motor for a one-step movement thereof. Such movement printing is employed even in the facsimile apparatus of the G1 or the G2 mode with a relatively long printing cycle.

Also in such G1 or G2 mode, there is conventionally employed a method of repeating the step of black color generation plural times for the same line, in order to increase the density of black color. Herein, black color generation means that a black image or dot appears on a heat sensitive recording sheet by heating such a sheet. This method allows one to increase the color density without loss in time, utilizing the relatively long interval between the lines in said G1 or G2 mode. However, this method results in an enlargement in the printed area in the case of the movement printing, since the first printing operation is conducted during the movement of the recording sheet while the second printing operation is conducted after the one-step movement of said sheet.

Such enlargement of the image area tends to obscure fine image patterns.

Figure 4A:
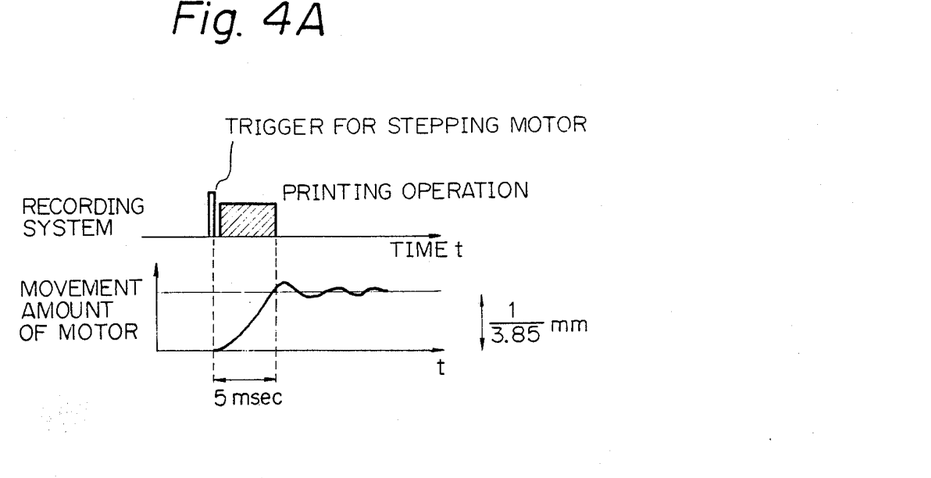
FIGS. 4A and 4B are timing charts showing the recording operation in a conventional process.
Figure 4B:
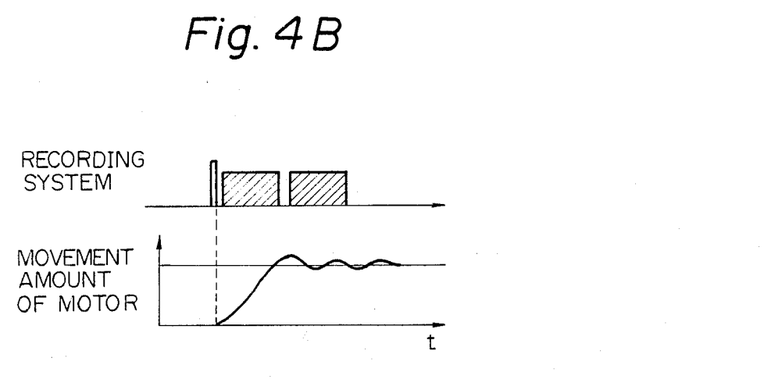

FIGS. 4A and 4B show the above-explained printing operation and the movement of the stepping motor.

At first reference is made to FIG. 4A for explaining the timing of movement printing. A CPU supplies the stepping motor with a trigger pulse for starting a one-step movement, and a printing operation is conducted. It is assumed that the duration of the printing pulse is 5 msec. In response to said trigger pulse, the stepping motor effects the movement of a step, which is normally equal to 1/3.85 mm. This movement also takes about 5 msec. but involves an oversheet, and requires additional time for the complete movement.

The printing operation is conducted after the emission of the trigger pulse for the stepping motor, in order to maintain a constant relationship between the moving distance provided by the motor and the timing of printing operation regardless of the interval of printing operations.

FIG. 4B is a timing chart for a case in which the printing operation is repeated twice in order to increase the density of black color generation in the G1 or G2 mode.

As shown in FIG. 4B, the first printing operation is conducted during the movement by the motor, while the second printing operation is conducted after said movement is almost completed.

Figure 5:
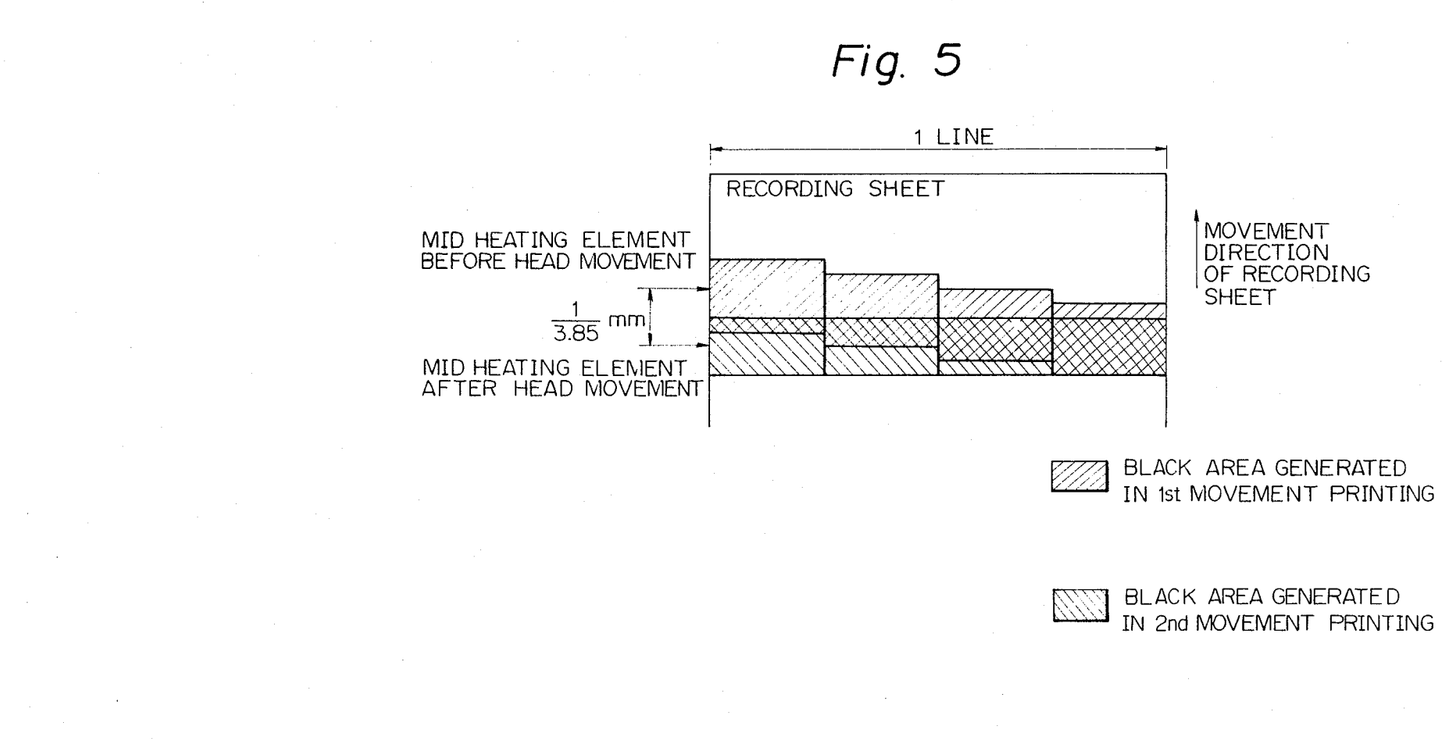
FIG. 5 is a schematic view showing the print obtained with said conventional recording operation.

FIG. 5 shows a case of printing a line in four blocks with a thermal head the length of the thermal element of which is equal to the length of one step (1/3.85 mm).

The first printing operation, conducted during movement, generates black color over a length of 1/3.85 mm. The second printing operation, conducted in a stopped state, generates black color over a length of 1/3.85 mm around the center of the heating element, after the head movement, in every block. As will be understood from FIG. 5, the enlargement of printed area is larger in the earlier blocks.

Also in the thermal printer of a facsimile apparatus designed for G1, G2 and G3 modes, said "movement printing" is employed in all the moves, by conducting the printing operation after the movement of the recording sheet is started.

However, though such control timing works satisfactorily in the G3 mode with a fast transmission speed and with a short printing cycle, it tends to result in an undesirable phenomenon of sticking in the G1 or G2 mode with longer printing cycles. The sticking phenomenon means the adhesion of the thermal recording sheet and the heating element of the thermal recording head, and tends to occur when the printing operation is conducted by activating a heating element maintained in contact with the thermal recording sheet and terminating the activation of the heating element without moving the recording sheet. Also said sticking becomes more marked as the number of heating dots in a line increases, or the temperature difference of the thermal head between the heated state and the cooled state increases. In the aforementioned timing control in which the printing operation is conducted after the movement of the recording sheet is started, therefore, the sticking tends to occur in the G1 or G2 mode in which the recording cycle is longer so that the heat dissipation of the thermal head is larger. The sticking between the thermal recording sheet and the thermal head leads to various troubles such as an increased load on the motor for moving the recording sheet, an increased noise level in the sheet movement, white streak formation on the printed image, or glossy surface formation of the thermal recording sheet.

SUMMARY OF THE INVENTION

An object of the present inention is to provide a thermal recording apparatus and a process therefor not associated with the above-explained draw-backs of the conventional related technology.

Another object of the present invention is to provide a thermal recording process and an apparatus therefor, capable, in a printing mode with a long recording cycle, of avoiding loss in time and providing a sharp image with an elevated density and with reduced image blur or image expansion.

According to one aspect of the present invention is provided a thermal recording process and an apparatus therefor capable of selecting either a first recording mode in which the recording operation is conducted during a relative movement of a recording sheet and a thermal head, or a second recording mode in which the recording operation is conducted while the recording sheet and the thermal head are stationary relative to each other.

According to another object of the present invention is provided a thermal recording process and an apparatus therefor, capable of adopting said first recording mode in case of recording with a variable cycle, and said second recording mode in case of recording with a fixed recording cycle.

According to another aspect of the present invention is provided a thermal recording process and an apparatus therefor, capable of adopting said second recording mode in case of recording with a long recording cycle, and said first recording mode in case of recording with a short recording cycle.

The foregoing and still other objects and features of the present invention, and the advantages thereof, will become fully apparent from the following detailed description, which is to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
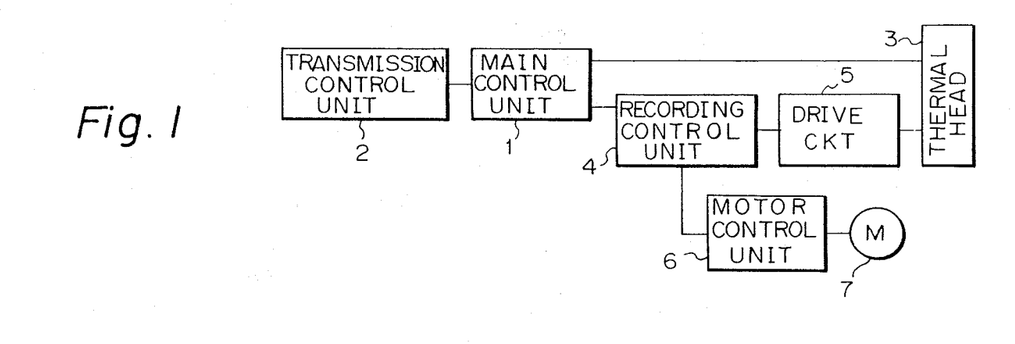
FIG. 1 is a block diagram of a thermal recording apparatus constituting a first embodiment of the present invention.

FIG. 1 is a block diagram of a thermal printer constituting a first embodiment of the present invention and adapted for use in a facsimile apparatus.

In FIG. 1, a main control unit 1, for controlling the functions of the entire apparatus such as image reading, communication, recording and display, is composed of a microcomputer, memory devices, etc. Said main control unit 1 receives image data from a transmission control unit 2 composed of a modem, a channel control unit, etc., effects suitable processing on said image data and releases the same after conversion into a format suitable for recording with a thermal head 3.

The thermal head 3 consists of a linear array of 1,000 to 2,000 heat-generating resistor elements arranged over the entire recording width of the recording sheet. Said resistor elements are divided into several blocks and receive power supply from a driving circuit 5 consisting of a driver element, etc. The timing or duration of power supply is controlled by a recording control unit 4 composed for example of a microcomputer in a similar manner to the main control unit 1.

The recording control unit controls not only the recording operation of the thermal head 3 but also the movement of the thermal recording sheet on which recording is to be made by the thermal head 3. The thermal recording sheet is moved, through a certain driving system, by a recording motor 7 composed for example of a stepping motor, of which energization is controlled by a motor control unit 6. The recording control unit 4 supplies said motor control unit 6 with a start trigger pulse, thereby activating the recording motor 7 and starting the movement of the recording sheet.

In the following there will be explained the functioning of the above-explained embodiment.

The facsimile apparatus shown in FIG. 1 is assumed to effect communication according to the G1, G2 or G3 mode according to the CCITT recommendation. The main control unit 1 converts the data received by the transmission control unit 2 into a format suitable for the thermal head according to the G1, G2 or G3 mode, and supplies the thus converted data to a latch of the thermal head 3. In the G3 mode, it decodes MH (Modified Huffman) or MR (Modified Read) codes of variable length.

After setting data to the thermal head 3, the main control unit 1 supplies a print command to the recording control unit 4, which in response determines a suitable drive timing and thus controls the power supply to the thermal head 3 through the driving circuit 5. The control unit 4 also drives the recording motor 7 through the motor control unit 6, thereby moving the thermal recording sheet.

Figure 2:
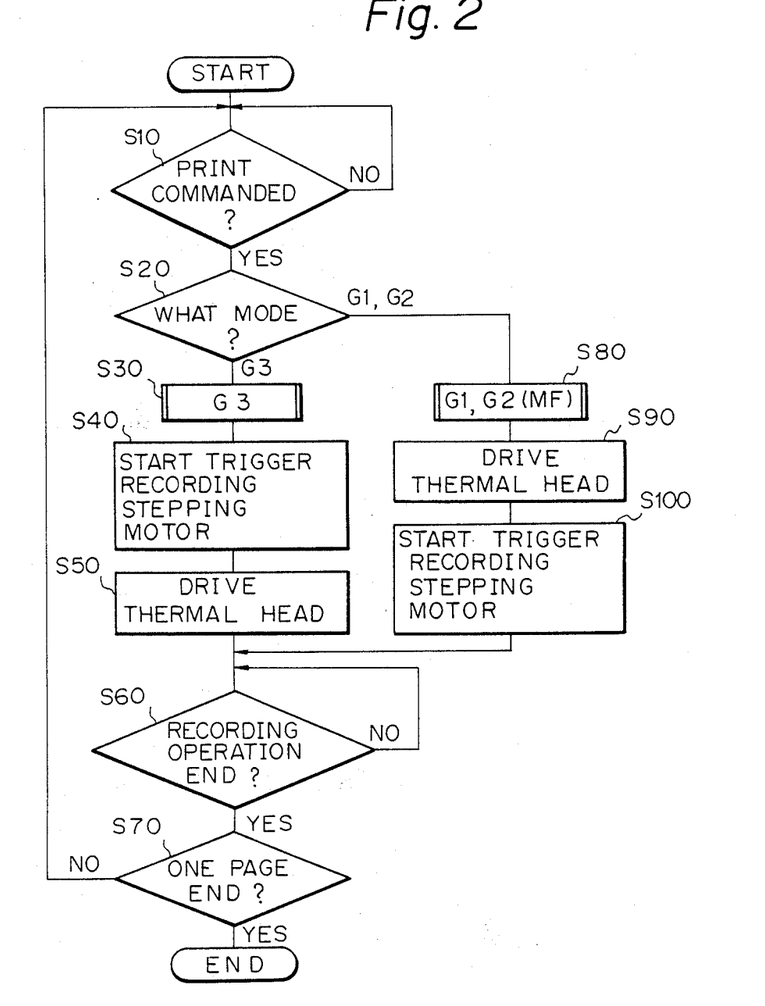
FIG. 2 is a flow chart showing the control sequence of a recording control unit shown in FIG. 1.

FIG. 2 is a flow chart showing the details of the control sequence of the recording control unit 4 shown in FIG. 1, and said sequence is stored, in the form of a control program, in a memory, such as a read-only memory (ROM), of the recording control unit 4.

Referring to FIG. 2, a step S10 detects the print command of the main control unit 1. Upon said detection, the recording control unit 4 identifies the communication mode as G1, G2 or G3 in a step S20. The program proceeds to a step S30 in the case of the G3 mode, or to a step S80 in the case of the G1 or G2 mode. The recording control unit 4 effects the activation of the thermal head 3 and the stepping motion of the recording motor 7 in steps S40 and S50 in the case of the G3 mode, or in steps S90 and S100 in the case of the G1, G2 or minifax, mode, but the sequence of the these operations is inverted between the G3 mode and the G1 or G2 mode, as will be apparent from FIG. 2.

More specifically, in the G3 mode, the step S40 supplies a start trigger pulse to the motor control unit 6 to activate the recording motor 7 for moving the thermal recording sheet, and then the step S50 supplies a strobe signal to the driving circuit 5 for initiating the energization of the thermal head 3. On the other hand, in the G1, G2 or minifax mode, the steps S90 and S100 effect the energization of the thermal head 3 and the start of sheet movement, in the stated, inverted order as, compared to said steps S40 and S50.

Then a step S60 discriminates when the recording operation for a line is completed, and, if completed, a step S70 discriminates whether the recording operation for a page is completed. If it is not completed yet, for example if an end-of-page (EOP) signal has not been received, the program returns to the step S10 to repeat the foregoing sequence until the recording operation for a page is completed. Upon completion of the recording of a page, the program proceeds for example to the termination of the communication, or a predetermined communication protocol.

Figure 3A:
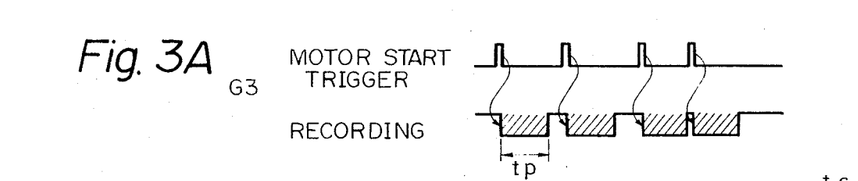
FIGS. 3A and 3B are timing charts showing the function of the apparatus shown in FIG. 1.
Figure 3B:
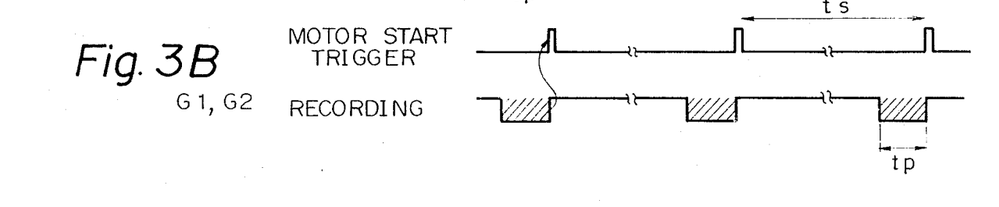

In the above-explained structure, the sequential order of the start trigger pulse for the recording motor 7 and the activation of the thermal head 3 is inverted, as shown in FIGS. 3A and 3B, according to the recording mode. In the G3 mode, the steps S40 and S50 supply the start trigger pulse to the recording motor 7 at first and then conduct the recording operation with the thermal head 3 as shown in FIG. 3A, and these two operations are repeated to achieve recording line by line. Thus, in this case, the recording operation is conducted during the movement of the recording sheet. On the other hand, in the G1, G2 or minifax mode, the steps S90 and S100 at first activate the thermal head 3 and then supply the start trigger pulse to the thermal head 3 as shown in FIG. 3B. In this case, therefore, the recording operation is conducted while the recording sheet is stopped.

The recording cycle as shown in FIG. 3B is fixed in the G1 or G2 mode and is equal to $\frac{1}{3}$ or 1/6 seconds, respectively. If the period tp of activation of the thermal head is 5 msec., there is left enough time before the next recording operation, so that the recording sheet is completely stopped before said next recording operation for the next line, even in consideration of the overshoot movement of the recording motor 7. Consequently the relationship between the movement of the recording sheet and the timing of recording operation is stable in every line, and there can be obtained uniform recording from line to line even under such control.

Also in the G1 or G2 mode, the motor is started immediately after the completion of the recording operation. Consequently the heating elements of the thermal head are not cooled at the heating position, so that the sticking between the thermal recording sheet and the thermal head can be avoided.

On the other hand, in the G3 mode, the recording operation is conducted after the start trigger pulse is supplied to the motor as in the conventional process, but the sticking can be avoided since the recording cycle is too short to cause the heat dissipation of the thermal head.

As explained in the foregoing, it is rendered possible, in any of the G1, G2 and G3 modes, to securely prevent the sticking phenomenon, to reduce the noises in the movement of the recording sheet without an excessive load on the recording motor 7, and to avoid deterioration of image quality resulting from the sticking phenomenon.

In the foregoing embodiment the timing control for the activation of the thermal head and the movement of the recording sheet is conducted by the recording control unit, but a similar structure can be realized also in case such operations are directly controlled by the main control unit. Also the above-explained process is possible not only in the case of recording received data but also in the case of a copying operation in which an image read by a reader unit is recorded. In such case the start trigger pulse for the recording motor is supplied first as in the G3 mode if the read image data are encoded, but the activation of the thermal head is conducted first as in the G1 or G2 mode if the image data are not encoded. However, in the above-explained copying operation, either the recording operation or the recording sheet movement may be conducted first without any practical inconvenience, if the image data are not encoded, since the time for transmission and decoding is unnecessary and the recording cycle can therefore be sufficiently short.

Furthermore, the structure of the present invention is applicable not only as the thermal printer in a facsimile apparatus but also in various thermal recording apparatus. For example, in the case of a thermal recording apparatus connected as an output unit for a computer system or the like, the sequential order of the activation of the thermal head and the recording sheet movement may be varied according to the detection of the recording mode or to the output of a timer for measuring the recording cycle.

As detailedly explained in the foregoing, the first embodiment of the present invention provides a thermal recording apparatus for scan recording by activating a recording element, consisting of an array of heating resistors, and by a relative movement of said recording element and a recording medium, wherein is provided is means for controlling the timing activation of said recording element and of relative movement of the recording element and the recording medium according to the recording cycle, thereby effectively preventing the sticking between the heating resistors of the recording element and the recording medium, thus reducing the noises in operation and preventing an increase in the power comsumption resulting from an increase in the load of the motor for effecting the relative movement of the recording medium and the recording element. In this manner a stable recording operation with a high image quality is assured.

In the following there will be explained a second embodiment of the present invention.

Figure 6:
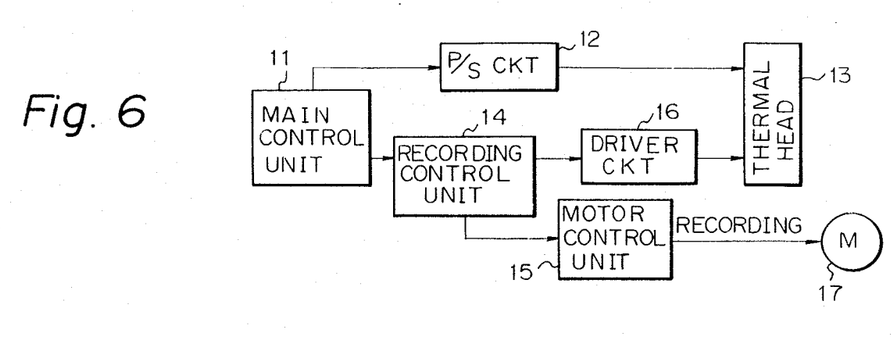
FIG. 6 is a block diagram of a second embodiment of the present invention.

FIG. 6 is a block diagram of said second embodiment, equipped with a main control unit 11 for controlling data recording, data reading, transmission and operation panel; a parallel-serial ("P/S") conversion circuit 12 for converting parallel data into serial data; a thermal head 13; a recording control unit (CPU) 14 for controlling the recording system; a motor control unit (CPU) 15 for controlling a motor; a driver circuit 16 for activating the thermal head; and a stepping motor 17 for stepwise moving a recording sheet relative to the thermal head.

Figure 7:
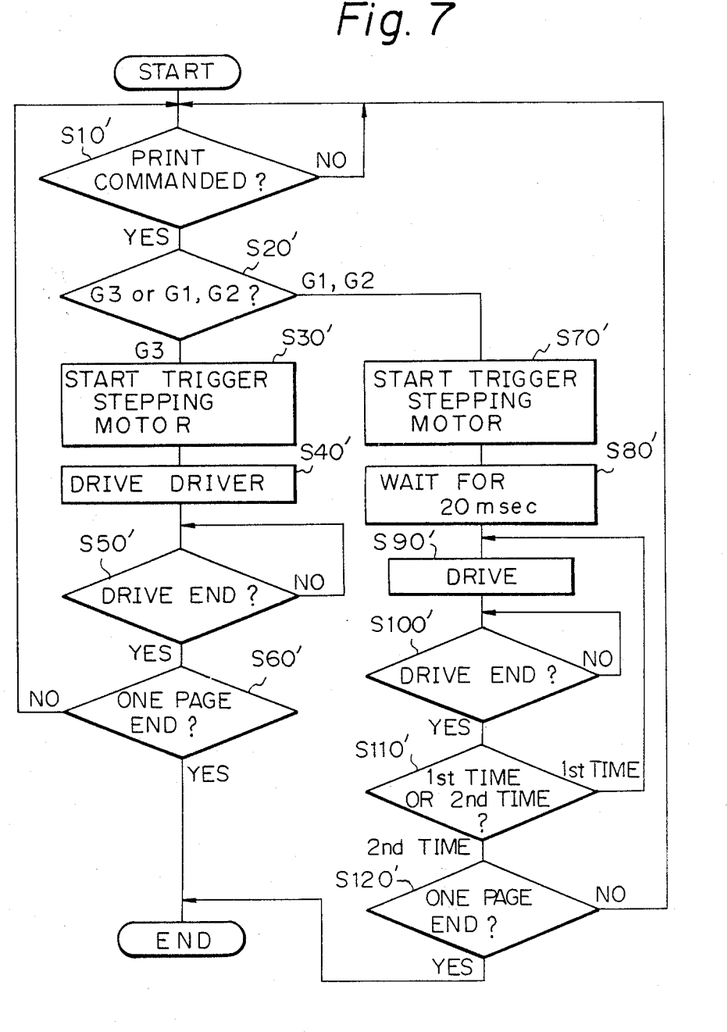
FIG. 7 is a flow chart showing the control sequence of a recording control unit 14 shown in FIG. 6.

In the following there will be given an explanation of the functioning of the above-explained embodiment, while making reference to a flow chart shown in FIG. 7.

At first, information indicating a receiving mode G1, G2 or G3 is supplied from the main control unit 11 to the recording control unit 14. Said information may be contained in a print command, but it is assumed, in this case, that mode information of a page is supplied prior to the print command, and the recording control unit 14 has a corresponding flag. The main control unit 11 supplies the recording control unit 14 with the print command after sending image data of a line through the conversion circuit 12.

Upon reception of said print command (S10'), the operation mode of said page is discriminated (S20'). In a case where the G3 mode is identified, a trigger pulse for starting the stepping motor 17 is supplied to the motor control unit 15 (S30'), and a voltage is almost simultaneously supplied to the thermal head 13 (S40'). In this manner the recording operation is conducted during the movement of recording sheet, and the completion of this operation is awaited (S50'), a flag, being provided for preventing the main control unit 11 from latching the data of the next line, during said voltage application.

If the end of a page is not identified (S60'), the program returns to the step S10' to await succeeding print command.

In the conventional process. the steps S10' to S60' are repeated also in the G1 or G2 mode. However, the interval of the print commands is fixed as 333 msec in the G1 mode, or 167 msec in the G2 mode, regardless of the image pattern. In the present embodiment, therefore, a different sequence is employed in a case where the step S20' discriminates the G1 or G2 mode.

In a case where the G1 or G2 mode is discriminated (S20'), the trigger pules for starting the motor is released (S70'), and there is provided a waiting time of 20 msec (S80'). Said waiting time corresponds to the time required for the recording sheet to stop completely, including the overshoot phenomenon of the motor 17, and is therefore dependent on the system. In the present embodiment said waiting time is selected as 20 msec, since the duration of voltage application and the time required for the one-step movement of the motor 17 are assumed each to be equal to 5 msec.

The waiting time can be determined in such a manner that "(period of voltage application) ×2+(waiting time)" does not exceed 167 msec.

Then the driver circuit 16 is activated (S90'), and, upon completion thereof (S100'), the activation is repeated once again (S110') for the same line.

Such repeated voltage application for printing the same data twice is adopted for increasing the density, since, in the G1 or G2 mode, the heating elements of the thermal head 13 show larger heat dissipation, because of the longer recording cycle thus resulting in a lowered density.

Figure 8:
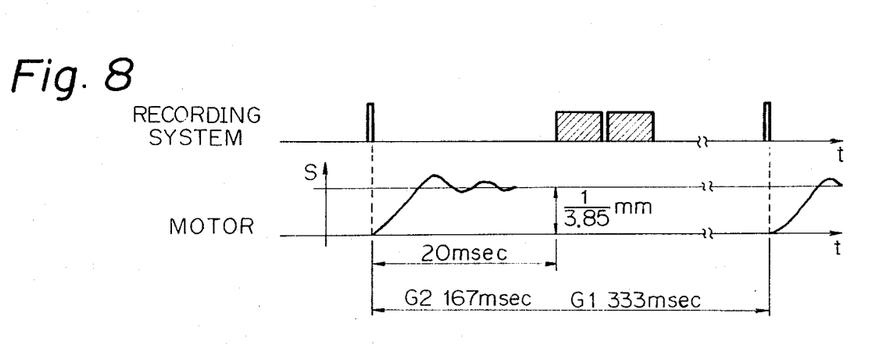
FIG. 8 is a timing chart showing the recording operation in said second embodiment.

FIG. 8 is a timing chart showing the timing of recording operation and the movement of motor in the G1 or G2 mode of the above-explained embodiment. As shown in FIG. 8, the recording operation is conducted after the recording sheet is completely stopped.

Though the foregoing explanation has been limited to the case of G1 or G2 mode, the foregoing embodiment is applicable also to any other recording modes or copying mode in which the recording cycle is fixed.

Also there has been explained the image expansion in a case of repeating the recording operation twice for increasing the recorded density, but the image quality is improved even in the recording operation conducted once, compared with the movement printing.

Furthermore, though the recording control unit 14 controls the waiting operation in the foregoing embodiment, the main control unit 11 may be utilized for conducing the waiting operation and the controlling the recording cycle if it has available time. Thus the control of the waiting time can be determined according to the mode of data transmission.

In this manner the second embodiment of the present invention varies the timing of recording operation and of the activation of the stepping motor according to the recording mode, thereby providing a satisfactory recorded image with reduced image expansion or blur.

As explained in the foregoing, the present invention allows one to obtain an image of a high quality without the influence of overshoot of the motor.

The present invention is not limited to the foregoing embodiment but is subject to various modifications and applications within the scope and spirit of the appended claims.

I claim:

1. A thermal recording apparatus comprising
    recording means comprising an array of plural heat generating resistor elements;
    moving means for causing a relative movement between said recording means and a recording medium;
    control means for controlling said recording means and said moving means, said control means being capable of setting a first recording mode in which said recording means is activated during the movement caused by said moving means, and a second recording mode in which said recording means is activated while said moving means is stopped; and
    selecting means for selecting either one of said first and second recording modes.

2. A thermal recording apparatus according to claim 1, wherein said selecting means is adapted to select either one of said first and second recording modes according to the length of the recording cycle.

3. A thermal recording apparatus according to claim 2, wherein said selecting means is adapted to select said second recording mode if the length of the recording cycle exceeds a predetermined time.

4. A thermal recording apparatus according to claim 1, wherein said selecting means is adapted to select said second recording mode when the length of the recording cycle is constant.

5. A thermal recording apparatus according to claim 1, wherein said selecting means is adapted to select said first recording mode when the length of the recording cycle is variable.

6. A thermal recording apparatus according to claim 1 and adapted for use in a facsimile apparatus, wherein the first recording mode is selected in the G3 mode of the CCITT recommendation, while the second recording mode is selected in the G1 or G2 mode of the CCITT recommendation.

7. A thermal recording apparatus according to claim 1, wherein said recording means is activated prior to the start of movement by said moving means in said second recording mode.

8. A thermal recording apparatus according to claim 1, wherein, in said second recording mode, said recording means is activated after the movement by said moving means and after the lapse of a predetermined time required for the stopping of said movement.

9. A thermal recording process comprising the steps of:
    activating a recording element comprising an array of heat generating resistors during a relative movement of said recording element and a recording medium to achieve scan recording; and
    controlling the timing of activation of the recording element and of relative movement of the recording element and the recording medium according to respective modes each of which has a different recording cycle.

10. A thermal recording processing according to claim 9 wherein, in a case in which the length of a cycle of scan recording is constant, the recording element is activated while the recording element and the recording medium are stationary relative to each other.

11. A thermal recording process according to claim 9 wherein, in a case in which the length of cycle of scan recording is variable, said recording element is activated while the recording element and the recording medium are in motion relative to each other.

12. A recording process comprising the steps of:
    moving a stepping motor by a step for every line;
    recording image information for every line for which information is to be recorded, with a thermal head; and
    controlling the timing of the activation of the stepping motor and of the recording operation according to respective modes each of which has a different recording cycle.

13. A recording process according to claim 12, wherein, in a case in which a recording cycle of said recording step is long, recording operation is initiated in said recording step after the lapse of a time requird for quenching overshoot of the stepping motor.

14. A recording process according to claim 12, wherein, in a case in which a recording cycle of said recording step is short, said recording step is initiated during activation of the stepping motor.

15. A thermal recording process according to claim 9, wherein the modes include a G1 mode.

16. A thermal recording process according to claim 9, wherein the modes include a G2 mode.

17. A thermal recording process according to claim 9, wherein the modes include a G3 mode.

18. A recording process according to claim 12, wherein the modes include a G1 mode.

19. A recording process according to claim 12, wherein the modes include a G2 mode.

20. A recording process according to claim 12, wherein the modes include a G3 mode.

21. A thermal recording apparatus which performs an image recording on a recording medium, comprising:

record means comprising a plurality of heatable resistive elements;

shift means for relatively shifting said record means and the recording medium;

recognition means for recognizing a recording cycle; and control means for controlling a heating timing of said record means and a relative-shift timing of said shift means, in accordance with a mode of the recording cycle recognized by said recognition means.

22. A thermal recording apparatus according to claim 21, wherein said control means is structured and arranged to cause activation of said record means prior to the start of movement of said record means relative to the recording medium by said shift means, responsive to said recognition means recognizing one made of recording cycle.

23. A thermal recording apparatus according to claim 22, wherein said control means is structured and arranged to cause activation of said record means after movement of said record means relative to the recording medium by said shift means, responsive to said recognition means recognizing another mode of recording cycle.

* * * * *

UNITED STATES PATENT AND TRADEMARK OFFICE
CERTIFICATE OF CORRECTION

PATENT NO. : 4,814,789

DATED : March 21, 1989

INVENTOR(S) : Ono

It is certified that error appears in the above-identified patent and that said Letters Patent is hereby corrected as shown below:

COLUMN 1
    Line 28, "Herein, black" should read --Herein "black--;
    Line 29, "generation means" should read --generation" means--;
    Line 36, "the" should be deleted (second occurrence); and
    Line 53, "oversheet," should read --overshoot,--.

COLUMN 2
    Line 5, "a length of 1/3.85mm" should read --a length of 1/3.85 x 5/4mm.--;
    Line 46, "inention" should read --invention--; and
    Line 65, "object" should read --aspect--.

COLUMN 6
    Line 9, "is" (second occurrence) should be deleted; and
    Line 62 "await" should read --await a--.

COLUMN 7
    Line 43, "the" (second occurrence) should be deleted; and
    Line 60, "comprising" should read --comprising:--.

COLUMN 8
    Line 49, "thermal recording processing" should read --thermal recording process--.

UNITED STATES PATENT AND TRADEMARK OFFICE
CERTIFICATE OF CORRECTION

PATENT NO. : 4,814,789

DATED : March 21, 1989

INVENTOR(S) : Ono

It is certified that error appears in the above-identified patent and that said Letters Patent is hereby corrected as shown below:

COLUMN 9
 Line 4, "requird" should read --required--.

COLUMN 10
 Line 17, "made" should read --mode--.

Signed and Sealed this

Twenty-ninth Day of August, 1989

Attest:

DONALD J. QUIGG

Attesting Officer

Commissioner of Patents and Trademarks